Nov. 3, 1936. V. W. KLIESRATH 2,059,246
MOTOR VEHICLE
Filed June 26, 1933
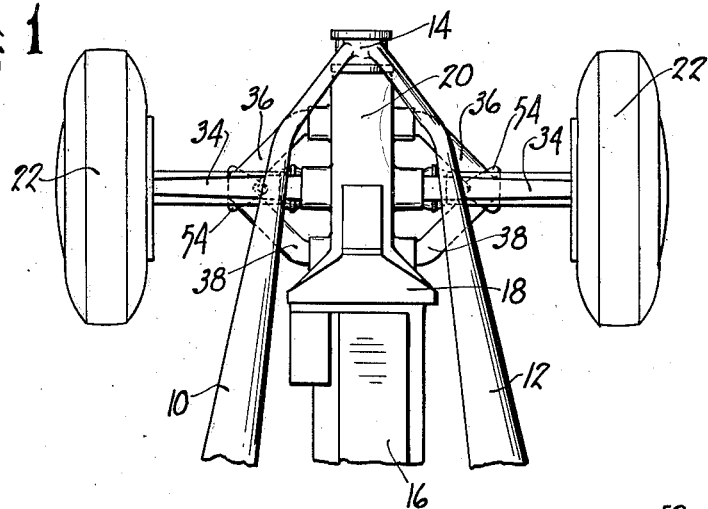
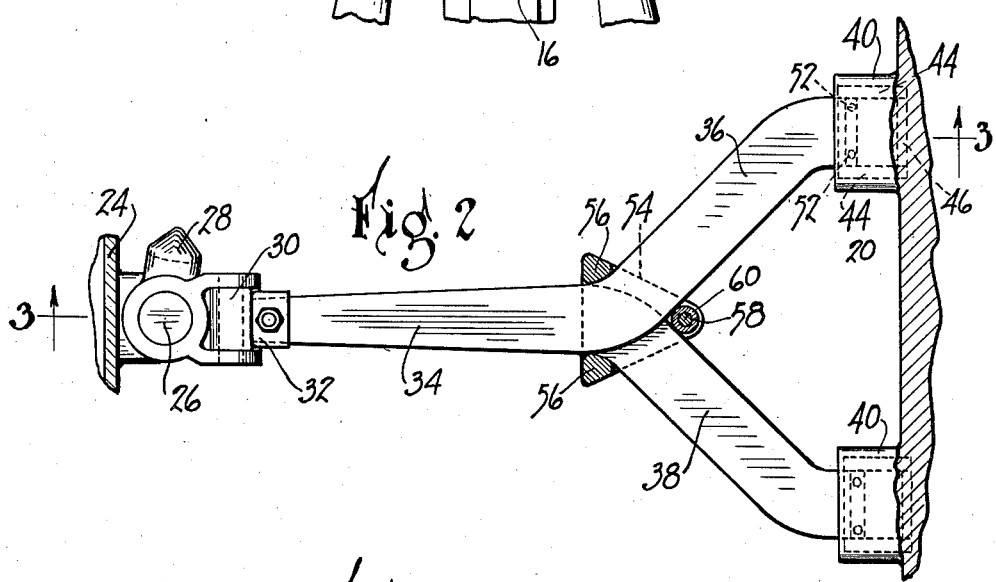
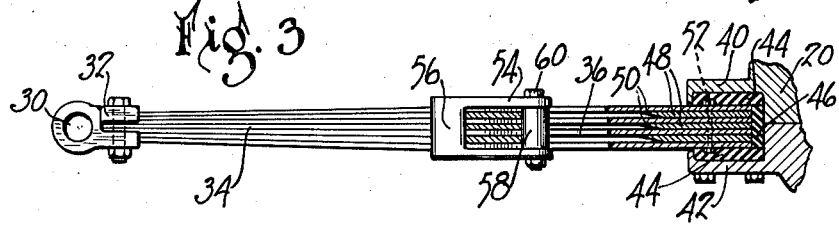
INVENTOR.
Victor W. Kliesrath
BY
ATTORNEY.

Patented Nov. 3, 1936

2,059,246

UNITED STATES PATENT OFFICE 2,059,246

MOTOR VEHICLE

Victor W. Kliesrath, South Bend, Ind., assignor to The Steel Wheel Corporation, Chicago, Ill., a corporation of New York Application June 26, 1933, Serial No. 677,612

12 Claims. (Cl. 280—106.5)

This invention relates to motor vehicle spring suspensions, and is illustrated in a vehicle having individually-sprung wheels.

An object of the invention is to provide a very strong and stable spring suspension which has great resilience, giving substantially the effect of long and easy-riding springs but with the advantages of individual springing. Preferably the springs are of the laminated leaf type, with their ends seated in sockets formed in a pivotally mounted power plant or other chassis part, and to give the maximum resilience I prefer to clamp the end of each spring in its socket between blocks of rubber or other resilient material.

Whether or not arranged in just this manner, according to an important feature of the invention the stability of the spring suspension lengthwise of the vehicle is promoted by giving each spring the shape of a Y in plan view, so that there are at the inner end of the spring two arms spaced apart a considerable distance lengthwise of the vehicle.

This may conveniently be done by deflecting the leaves alternately forward and back, with a novel clip or the like clamping the leaves of the spring together where the arms diverge. In this case I prefer to provide spacers or separators between the adjacent leaves of each arm, and in the arrangement illustrated these spacers are at the end of the arm where it is seated in its socket. The spacers may be beveled so that the adjacent spring leaves do not bend back and forth across a sharp edge.

The above and other objects and features of the invention, including various novel combinations of parts and desirable particular constructions, will be apparent from the following description of the illustrative embodiment shown in the accompanying drawing, in which:
Figure 1 is a top plan view of the front end of a motor vehicle chassis embodying my invention;

Figure 2 is a top plan view of one front spring and associated parts, partly in section, and on a larger scale than Figure 1; and Figure 3 is a section through the front spring of Figure 2, on the line 3—3 of Figure 2.

In this drawing my invention is shown embodied in a motor vehicle of the general type fully described, and claimed, in applications No. 651,821, filed January 14, 1933, and No. 677,610, filed June 26, 1933. As more fully explained in those applications, the vehicle includes a chassis having a base or frame having a transverse dash provided with cantilever arms 10 and 12, connected at their forward ends by a bearing 14 alined with a bearing (not shown) on the dash. The two bearings yieldably and pivotally support, through the medium of rubber bushings or the like, a power plant which may consist of an engine 16, a clutch having a housing 18, and a transmission and differential having a casing 20 and arranged to drive the front road wheels 22. The engine, clutch, transmission, and differential all form one rigid pivotally-mounted unit.

The present invention has to do with the means for supporting the chassis on the road wheels, the front pair of which is shown at 22. Each wheel is journaled on a spindle on a knuckle 24, swiveled as explained in said prior application No. 651,821 by means such as a kingpin 26 on a bowed vertical member 28 having at its upper and lower ends pivot pins 30 connecting it to fittings or eyes 32 at the ends of novel spring members or axle substitutes 34.

Each of the two spring members 34 at each wheel is in the shape of a Y in plan view, as appears in Figures 1 and 2, with its fitting 32 bolted or otherwise secured to the end of the stem of the Y. Preferably this shape is obtained by deflecting the leaves alternately forward and back to form arms 36 and 38.

These arms are seated at their ends in sockets 40, formed in the case of the front springs in the transmission and differential casing 20, and which sockets include removable caps 42 bolted in place and holding under considerable pressure blocks 44 and 46 of rubber or other resilient material engaging the top and bottom, and the end, of the arm 36 (or 38).

The spaces between the leaves in each arm 36 and 38 are preferably filled, at least at the ends of the arms, by spacers 48 of spring steel, which may be beveled or rounded at 50 at their outer ends so that the transverse pressure on each leaf does not come on too sharp an edge. These spacers, and the ends of the leaves, may be fastened together by rivets or other fastenings 52.

The leaves may also be held by means such as a clip 54 having parts 56 engaging the sides of the leaves, and another part such as a sleeve 58 held by a bolt 60 and which is arranged in the angle between the diverging arms 36 and 38.

It will be seen that the resilience of the rubber blocks 46 and 44 is compounded with the resilience of the spring leaves, giving the effect of relatively long and soft-riding springs but without the weight of ordinary springs and without requiring any axle. At the same time, since the arms 36 and 38 of each spring are spaced apart a considerable distance lengthwise of the vehicle, the springs are very strong and rigid in resisting side shocks, road shocks, and twisting strains.

While one illustrative embodiment has been described in detail, it is not my intention to limit the scope of the invention to that particular embodiment, or otherwise than by the terms of the appended claims.

I claim:

1. A vehicle having road wheels, a pivotally mounted power plant device having front and rear sockets on each side, laminated leaf springs arranged in two pairs, each pair being connected to one of the wheels and with the springs of each pair arranged one above the other and having the leaves of each spring deflected alternately forward and backward to give the spring the shape of a Y in plan view to provide two spaced inner arms having their ends seated respectively in one of the front and one of the rear sockets, and means for yieldingly holding the end of each arm in its socket.

2. A vehicle having road wheels, a pivotally mounted power plant device having front and rear sockets on each side, laminated leaf springs arranged in two pairs, each pair being connected to one of the wheels and with the springs of each pair arranged one above the other and having the leaves of each spring deflected alternately forward and backward to give the spring the shape of a Y in plan view to provide two spaced inner arms having their ends seated respectively in one of the front and one of the rear sockets, and rubber blocks for yieldingly holding the end of each arm in its socket.

3. A vehicle having road wheels, a chassis part having front and rear sockets on each side, laminated leaf springs arranged in two pairs, each pair being connected to one of the wheels and with the springs of each pair arranged one above the other and having the leaves of each spring deflected alternately forward and backward to give the spring the shape of a Y in plan view to provide two spaced inner arms having their ends seated respectively in one of the front and one of the rear sockets, and means for yieldingly holding the end of each arm in its socket.

4. A vehicle having road wheels, a chassis part having front and rear sockets on each side, laminated leaf springs arranged in two pairs, each pair being connected to one of the wheels and with the springs of each pair arranged one above the other and having the leaves of each spring deflected alternately forward and backward to give the spring the shape of a Y in plan view to provide two spaced inner arms having their ends seated respectively in one of the front and one of the rear sockets, and rubber blocks for yieldingly holding the end of each arm in its socket.

5. A vehicle having independently sprung road wheels, a pivotally mounted power plant having a casing provided with upper and lower sockets in its opposite sides, and upper and lower axle members on opposite sides of the vehicle connected to the corresponding wheels and having their ends seated in said sockets, and at least one of which members on each side of the vehicle consists of a laminated leaf spring.

6. A vehicle having road wheels, a chassis part having sockets in its opposite sides, laminated leaf springs Y-shaped in plan view and having said wheels mounted at their outer ends and each having at its inner end spaced forward and rear arms seated at their ends in said sockets, and resilient means in each socket yieldingly holding the end of the corresponding spring arm.

7. A vehicle having a laminated leaf spring Y-shaped in plan view and having the leaves deflected alternately forward and back to form the arms of the Y.

8. A vehicle having a laminated leaf spring Y-shaped in plan view and having the leaves deflected alternately forward and back to form the arms of the Y, and means clamping the leaves of the spring together where the arms of the Y diverge.

9. A vehicle having a laminated leaf spring Y-shaped in plan view and having the leaves deflected alternately forward and back to form the arms of the Y, and spacers between the successive leaves forming each arm of the Y.

10. A vehicle having a laminated leaf spring Y-shaped in plan view and having the leaves deflected alternately forward and back to form the arms of the Y, spacers between the successive leaves forming each arm of the Y, and means clamping the leaves of the spring together where the arms of the Y diverge.

11. A vehicle having a Y shaped laminated leaf spring the stem and diverging arms of the Y being integral and a clip having side parts confining the leaves forming the stem of the Y and another part in the angle between the diverging arms of the Y.

12. A vehicle having a laminated leaf spring with alternate leaves deflected out of line with the others and having spacers with beveled ends between said alternate leaves.

VICTOR W. KLIESRATH.